United States Patent
Kaufhold et al.

(10) Patent No.: US 6,628,098 B2
(45) Date of Patent: Sep. 30, 2003

(54) METHOD FOR ACCELERATING A CONTROL MOVEMENT IN A POSITIONER SYSTEM WITH STEP MOTORS

(75) Inventors: Tobias Kaufhold, Jena (DE); Ralf Joram, Erlangen (DE)

(73) Assignee: Carl Zeiss Jena GmbH, Jena (DE)

( * ) Notice: Subject to any disclaimer, the term of this patent is extended or adjusted under 35 U.S.C. 154(b) by 105 days.

(21) Appl. No.: 09/959,291

(22) PCT Filed: Feb. 15, 2001

(86) PCT No.: PCT/EP01/01662
§ 371 (c)(1),
(2), (4) Date: Oct. 17, 2001

(87) PCT Pub. No.: WO01/61836
PCT Pub. Date: Aug. 23, 2001

(65) Prior Publication Data
US 2002/0185988 A1 Dec. 12, 2002

(30) Foreign Application Priority Data
Feb. 17, 2000 (DE) .................. 100 07 212

(51) Int. Cl.[7] .................. H02P 8/00
(52) U.S. Cl. .................. 318/696; 318/685; 318/138; 318/254; 310/49
(58) Field of Search .................. 318/138, 254, 318/685, 696; 310/49

(56) References Cited

U.S. PATENT DOCUMENTS

| | | | | | |
|---|---|---|---|---|---|
| 3,805,138 | A | * | 4/1974 | Hilker | 318/696 |
| 3,818,261 | A | * | 6/1974 | Clarke et al. | 318/696 |
| 4,280,084 | A | * | 7/1981 | Chiang | 318/696 |
| 4,417,188 | A | * | 11/1983 | Makabe et al. | 318/696 |
| 4,417,189 | A | * | 11/1983 | Overfield | 318/696 |
| 4,484,123 | A | * | 11/1984 | Raducanu | 318/696 |
| 4,661,754 | A | * | 4/1987 | Tajima et al. | 318/696 |
| 4,791,345 | A | * | 12/1988 | Boillat | 318/696 |
| 4,812,727 | A | * | 3/1989 | Sakai et al. | 318/696 |
| 4,831,319 | A | * | 5/1989 | Heinrich | 318/696 |
| 4,887,307 | A | * | 12/1989 | Orii et al. | 388/810 |
| 5,237,254 | A | * | 8/1993 | Guerin | 318/685 |
| 6,211,642 | B1 | * | 4/2001 | Holdaway | 318/696 |

FOREIGN PATENT DOCUMENTS

| | | |
|---|---|---|
| DE | 31 10 784 | 1/1982 |
| DE | 31 41 235 | 8/1982 |
| DE | 31 38 554 | 4/1983 |
| DE | 44 17 424 | 11/1995 |
| DE | 44 29 001 | 2/1996 |
| DE | 195 01 652 | 7/1996 |
| DE | 196 33 740 | 2/1998 |
| DE | 198 22 256 | 12/1999 |
| GB | 1 579 121 | 11/1980 |
| WO | WO 99/60346 | 11/1999 |

* cited by examiner

Primary Examiner—Robert E. Nappi
Assistant Examiner—Tyrone Smith
(74) Attorney, Agent, or Firm—Reed Smith LLP

(57) ABSTRACT

A method for the acceleration of the adjusting movement in a positioning system in which at least one stepping motor is controlled at a variable control frequency f, the adjusting speed is dependent upon the control frequency f, and a positioning step of the adjusting movement is initiated at every period of the control frequency f. In a method of the type mentioned above, it is provided that a permissible control frequency $f_{zul}$ is initially assigned to every positioning step within an adjustment area, the assignments of control frequencies $f_{zul}$ and positioning steps are stored as a data record, and during the adjusting movement a comparison is made for each positioning step between the current control frequency $f_{ist}$ and the permissible control frequency $f_{zul}$ of the subsequent positioning step and, depending on the results of this comparison, the control frequency f for the subsequent step is increased when the result of the comparison is $f_{ist}<f_{zul}$, the control frequency f for the subsequent step is maintained when the result of the comparison is $f_{ist}=f_{zul}$, or the control frequency f for the subsequent step is reduced when the result of the comparison is $f_{ist}>f_{zul}$.

5 Claims, 2 Drawing Sheets

METHOD FOR ACCELERATING A CONTROL MOVEMENT IN A POSITIONER SYSTEM WITH STEP MOTORS

CROSS-REFERENCE TO RELATED APPLICATIONS

This application claims priority of PCT application Serial No. PCT/EP01/01662, filed Feb. 15, 2001 and German application No. 100 07 212.7 of Feb. 17, 2000, the complete disclosures of which are hereby incorporated by reference.

BACKGROUND OF THE INVENTION a) Field of the Invention

The invention is directed to a method for the acceleration of the adjusting movement in a positioning system in which at least one stepping motor is controlled at a variable control frequency f, the adjusting speed is dependent upon the control frequency f, and a positioning step of the adjusting movement is initiated at every period of the control frequency f, wherein the total number of successive positioning steps corresponds to the length of an adjustment area and a determined position within the adjustment area is assigned to every positioning step.

b) Description of the Related Art

It is known to transform the step angles defined for a stepping motor into increments of a longitudinal movement and, on this basis, to operate positioning systems by means of which displacements of device component groups are carried out with high accuracy along an adjustment area or a path. With a suitable arrangement of the coils and phase control of the stepping motor, a sensitive control can be achieved and, therefore, the rotational movement can be advanced in step angles which are so small that even in optical precision instruments such as zoom devices in microscopes the precise positioning of the zoom groups required for changing the magnification while retaining imaging sharpness is achieved.

In the current state of development, typical step angles are 3.75° in permanently excited stepping motors, 1.8° in hybrid stepping motors and 1° in variable reluctance stepping motors. Generally, spindle systems are used to transform the rotational movement into a longitudinal movement.

A problem which must always be taken into consideration when configuring positioning systems with stepping motors consists in that the available torque decreases as the stepping frequency increases because of the limited current rise rate in the turns of the motor winding. Since part of the torque is used for the acceleration of the external mass, e.g., of a zoom group to be displaced, the control frequency range available for starting and stopping decreases as the moment of inertia increases.

Provided the stepping motor is operated with a control frequency in the start and stop frequency range, it can be stopped at any time without step losses. However, in the acceleration frequency range lying within the upper start limit frequency and operating limit frequency, it is impossible to stop the stepping motor without step loss.

Accordingly, in order to prevent inaccuracies in positioning and to achieve short adjustment times at a given load moment, it is necessary to increase the control frequency successively over the start frequency range and the acceleration frequency range to the operating limit frequency, i.e., acceleration must be carried out step by step until the maximum possible speed is reached when controlling at the operating limit frequency. Conversely, the control frequency must be reduced down to the stop frequency range already before reaching the target position of a component group to be displaced and the stepping motor must accordingly be braked.

The displacement must usually be carried out as quickly as possible and the respective component group must be brought quickly into a given position. In order to accomplish this, acceleration functions and deceleration functions are given in the form of curve paths, also known within technical circles as acceleration and deceleration ramps.

In following the path of an acceleration ramp of this kind, the stepping motors are accelerated by increasing the control frequency up to its maximum rotation speed, wherein the possible increase in the control frequency from step to step is always dependent upon the technical characteristics or efficiency of the respective stepping motor and upon the coupled load.

To this extent, acceleration functions which run linearly are given for ranges of rotation speed in which the step frequency/torque characteristic has an approximately linear function. At higher rotation speed ranges, the acceleration function is based on exponential forms because the latter can be adapted very well to the curve of the step frequency/torque characteristic.

When an adjustment area extending, for example, over a straight path is broken down into individual increments whose quantity is proportional to the step angles and which will be referred to hereinafter as positioning steps, extreme positions can be determined within an adjustment area in which a component group is to he displaced by a definitely predetermined sequence of movements, such extreme positions being starting positions, stopping positions and turning or reversing positions, wherein the movement direction of the component group is reversed in the latter position.

When the component group approaches a stopping or reversing position during displacement, the control frequency must be reduced promptly in the stop frequency range.

Accordingly, it can be indicated for any position within the adjustment area, depending on its distance to one of the extreme positions, whether the control frequency must subsequently be increased, maintained or reduced in the movement direction in order to achieve the operating mode that is optimum with respect to adjustment speed and positioning accuracy.

In the method known from the prior art for controlling stepping motors, the stopping position possible at the time is always compared for this purpose during the adjusting movement to the extreme position to be moved to and the braking process is initiated by reducing the control frequency when the possible stopping position and the extreme position coincide. However, it is disadvantageous that this procedure requires a relatively large storage capacity and calculating capacity.

On the other hand, in another known method, the extreme positions are stored and it is calculated beforehand during the adjusting movement for every positioning step whether or not the current speed lies within the permissible range. Depending on this, it is decided whether the speed should be accelerated, stopped or decelerated. However, the storage capacity and the necessary calculating time can also not be substantially reduced in this way.

The disadvantages mentioned above are of particular concern when the positioning systems in question comprise a plurality of stepping motors for adjusting movements of different component groups. WO 99/60436 describes an "arrangement for direct control of the movement of a zoom system in a stereo microscope" in which the positioning of the optical zoom groups is provided with separately controlled stepping motors.

In the prior art, with this type of control, the extreme positions of all movement sequences are stored and, as was already mentioned, it is determined in advance for the individual positioning steps whether or not the current speed is in the permissible range which, however, involves the disadvantages already mentioned above.

On this basis, the invention has the object of further developing a method of the type described in the beginning in such a way that the fastest possible movement sequence can be achieved while retaining a high positioning accuracy and reducing technical expenditure.

According to the invention, it is provided in a method of this kind for accelerating the adjusting movements in a positioning system that a permissible control frequency $f_{zul}$ must initially be assigned to every positioning step within an adjustment area. The assigned control frequencies $f_{zul}$ and positioning steps are stored as a data record in a storage in such a way that they can be called up. During the adjusting movement, a comparison is made for each positioning step between the current control frequency $f_{ist}$ and the permissible control frequency $f_{zul}$ of the positioning step coming next in the movement direction and, depending on the results of this comparison, the control frequency f is increased for the subsequent step when the result of the comparison is $f_{ist} < f_{zul}$, the control frequency f is maintained for the subsequent step when the result of the comparison is $f_{ist} = f_{zul}$ or the control frequency f is reduced for the subsequent step when the result of the comparison is $f_{ist} > f_{zul}$.

By assigning positioning steps and maximum permissible control frequencies $f_{zul}$, a speed vector is obtained which relates to the entire adjustment area and which contains the permissible speeds of the total system for every path element and every positioning step and which accordingly shows the envelope of the allowed speeds for the adjustment area.

When using the method according to the invention, in order to assess the current speed or to ascertain whether or not the speed can be further increased, it is only necessary to check whether or not the permissible control frequency $f_{zul}$ for the subsequent positioning step is greater than the current control frequency $f_{ist}$. If so, the adjusting movement is accelerated by increasing the control frequency f.

This is also true in an analogous sense for cases where the permissible control frequency $f_{zul}$ assigned to the subsequent positioning step is as great as the current control frequency $f_{ist}$ and also for cases in which the permissible control frequency $f_{zul}$ assigned to the subsequent positioning step is less than the current control frequency $f_{zul}$.

In the former case, the control frequency f remains unchanged; in the latter case the control frequency f is reduced. Since the control frequency f is proportional to the speed of the adjusting movement, as was already mentioned, the speed of the adjusting movement is maintained or reduced.

This results in the advantage that calculating capacity is required only for comparing the current control frequency $f_{ist}$ to the control frequency $f_{zul}$ which is permissible for the subsequent positioning step. The calculating expenditure is therefore substantially reduced compared to the prior art. The storage requirement is reduced and, in this way, all adjusting movements are carried out at the maximum possible speed adapted to the respective positioning system.

The adaptation of the highest possible speeds over the entire adjustment area depends on the technical characteristics of the respective stepping motors that are used and, for example, on the mass to be moved. These criteria are taken into account in determining the permissible speeds in relation to every positioning step.

In so doing, it is possible to operate the positioning system in automatic mode as well as by manual control. With manual operation, it is ensured that an arbitrary increase in the adjustment speed can not be carried out because the control frequencies $f_{zul}$ for every path element and for every positioning step are stored in the control circuit and excess increase is blocked.

In a preferred construction of the invention, extreme positions, preferably starting positions, reversing positions and stopping positions, are determined within the adjustment area or within a path and the permissible control frequency $f_{zul}$ for every positioning step is determined depending on its distance from an extreme position.

In this way, it is possible to take into account the ramps during the control of the acceleration and deceleration curve processes. In the area of an acceleration curve, the current control frequency $f_{ist}$ is always less than the permissible control frequencies $f_{zul}$ for the next positioning step in the movement direction. In the area of a deceleration curve, on the other hand, the current control frequency $f_{ist}$ is always greater than the permissible control frequencies $f_{zul}$ for the next positioning step in the movement direction.

Further, a maximum permissible control frequency $f_{max}$ which corresponds, for example, to the limit operating frequency of the corresponding stepping motor can be predetermined, so that overdriving of the stepping motor is ruled out. The maximum permissible control frequency $f_{max}$ is advantageously identical to the permissible control frequency $f_{zul}$ in the portions of a path in which displacing or advancing can be carried out at maximum speed.

In another preferred construction of the invention, different maximum permissible control frequencies $f_{max}$ and, accordingly, different maximum adjustment speeds are given within the whole adjustment area. For example, it is possible to give a maximum permissible control frequency $f_{grob}$ for a coarse adjustment at higher speed for a first portion of an adjustment area and a maximum permissible control frequency $f_{ein}$ for a fine adjustment at a lower speed for another portion.

The invention will be explained more fully in the following with reference to an embodiment example.

DESCRIPTION OF THE PREFERRED EMBODIMENTS

Figure 1:
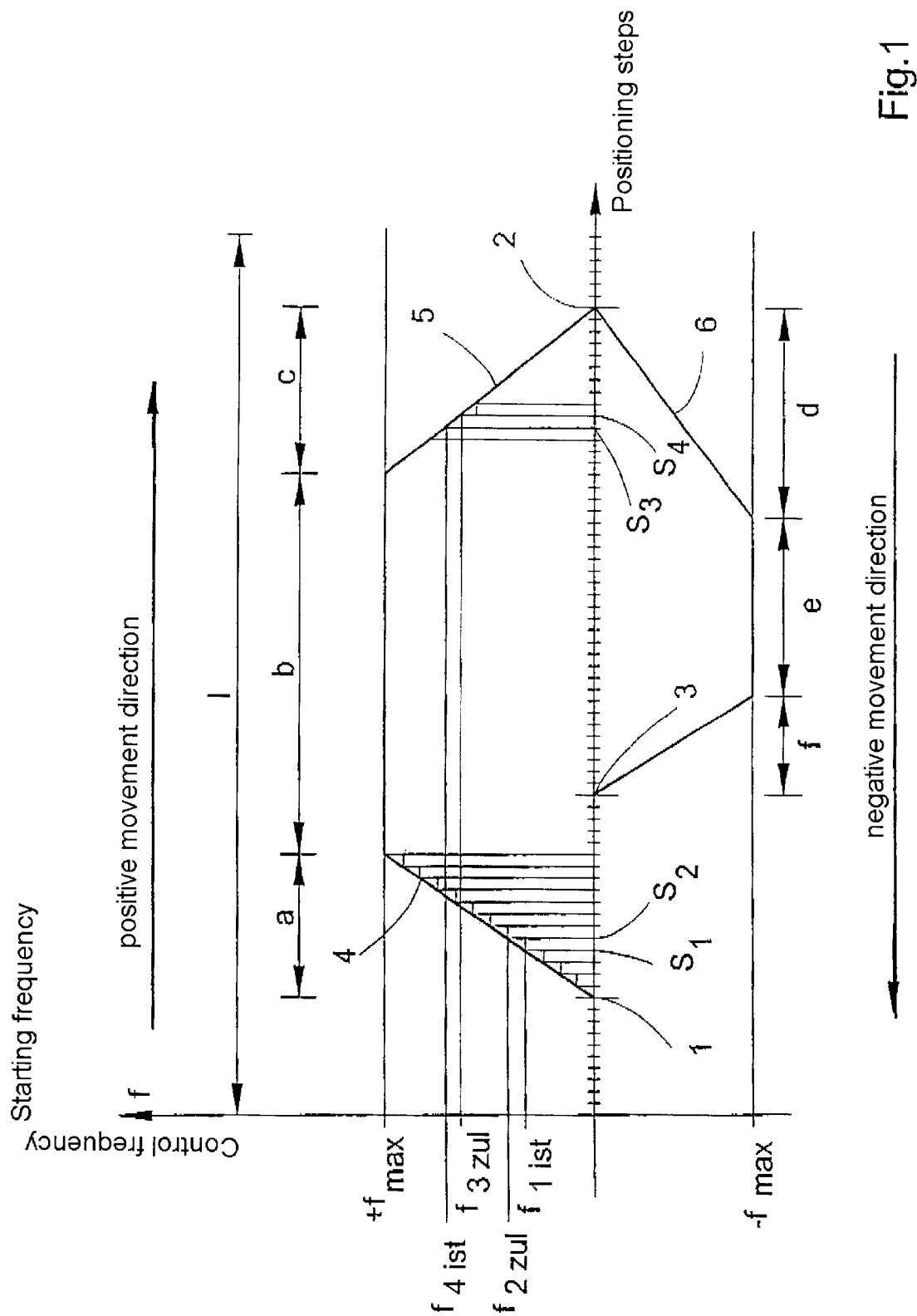
FIG. 1 shows a schematic view of the acceleration process in an adjustment area with a starting position, a stopping position and a reversing position.

In the view according to FIG. 1, the positioning steps for an adjustment area 1 are shown on the abscissa and the control frequencies f which are proportional to the adjustment speed over the adjustment area 1 are shown on the ordinate. Let+$f_{max}$ be stored as limit value for a positive movement direction and let –$f_{max}$ be provided as limit value for the opposite negative movement direction.

When control frequencies $+f_{max}$ or $-f_{max}$ are given by the control circuit at the stepping motor, the adjusting movement is carried out at maximum speed in the corresponding direction.

The quantity of positioning steps shown (not true to scale) are associated with three extreme positions in FIG. 1, namely, a starting position 1, a reversing position 2 and a stopping position 3.

According to the invention, a permissible control frequency $f_{zul}$ is assigned to each of the positioning steps of the adjustment area. The adjustment area 1 has acceleration curves 4 and 6 in portions a and d, wherein the permissible control frequencies $f_{zul}$ differ for adjacent positioning steps. The same is true for portions c and f with deceleration curves 5 and 7; here also, the permissible control frequencies $f_{zul}$ differ for adjacent positioning steps. The permissible control frequencies $f_{zul}$ are the same for adjacent positioning steps in portions b and e in which the adjustment speed should proceed uniformly.

FIG. 1 shows that the permissible control frequencies $f_{zul}$ of all positioning steps are "enveloped" by the speed curve which begins at starting position 1 for the positive movement direction and which extends over the acceleration curve 4, portion b and the deceleration curve 5 to the reversing position 2. For the negative movement direction, this envelope begins at the reversing position 3 and extends over the acceleration curve 6, portion e with uniform adjustment speed and deceleration curve 7 to the stopping position 3.

According to the invention, this assignment of positioning steps and permissible adjustment speeds is stored in a data record and stored as an envelope for the speed control in the control circuit.

When the adjusting movement which is indicated by way of example is initiated for every start signal, the displacement in the start position 1 begins with a uniformly accelerated movement corresponding to the acceleration curve 4. According to the invention, for each positioning step, the current control frequency $f_{ist}$ is compared to the control frequency $f_{zul}$ assigned to the next positioning step.

The results of this comparison are always $f_{ist} < f_{zul}$ for as long as the positioning steps in portion a are run through, so that the current control frequency $f_{ist}$ is increased to the permissible control frequency $f_{zul}$ for the next positioning step.

This will be illustrated by way of example with reference to the comparison of positioning step $S_1$, to which control frequency $f_{1zul}$ is assigned, to positioning step $S_2$, to which control frequency $f_{2zul}$ is assigned. Before positioning step $S_1$ is carried out, the control frequency is increased by the control circuit to $f_{1zul}$, so that currently $f_{1zul} = f_{1ist}$. During positioning step $S_1$, control frequency $f_{1ist}$ is compared to control frequency $f_{2zul}$ which is assigned to positioning step $S_2$. The comparison gives $f_{1ist} < f_{2zul}$, so that control frequency $f_{1ist}$ is increased to $f_{2zul}$, which results in the acceleration of the adjusting movement. During positioning step $S_2$ which takes place in accelerated manner, control frequency $f_{2zul}$ becomes $f_{2ist}$, and the comparison to $f_{zul}$ of the subsequent positioning step is based on $f_{2ist}$.

When the positioning steps are run through within the acceleration curve 4, portion b is reached, where $f_{ist} = f_{zul} = f_{max}$ is always true when comparing two successive positioning steps, so that the same control frequency f is given for the subsequent positioning step as for the current positioning step and, as a result, the adjusting speed is maintained.

For the successive positioning steps $S_3$ and $S_4$ within portion c comprising the deceleration curve 5, $f_{3ist} < f_{4zul}$ (this is also true, in analogous manner, for all other positioning steps in this portion c); as a result, the control frequency f is reduced and the adjusting speed is accordingly decreased.

After passing through the reversing position 2, the control frequency f is again increased according to the same principle from positioning step to positioning step within portion d, that is, the acceleration curve 6, until $-f_{max}$ is reached.

In this way, according to the invention, the adjusting movement is always carried out at the highest possible speed, depending on the system, while expenditure which consists only in comparing the current and permissible control frequencies f is reduced.

Figure 2:
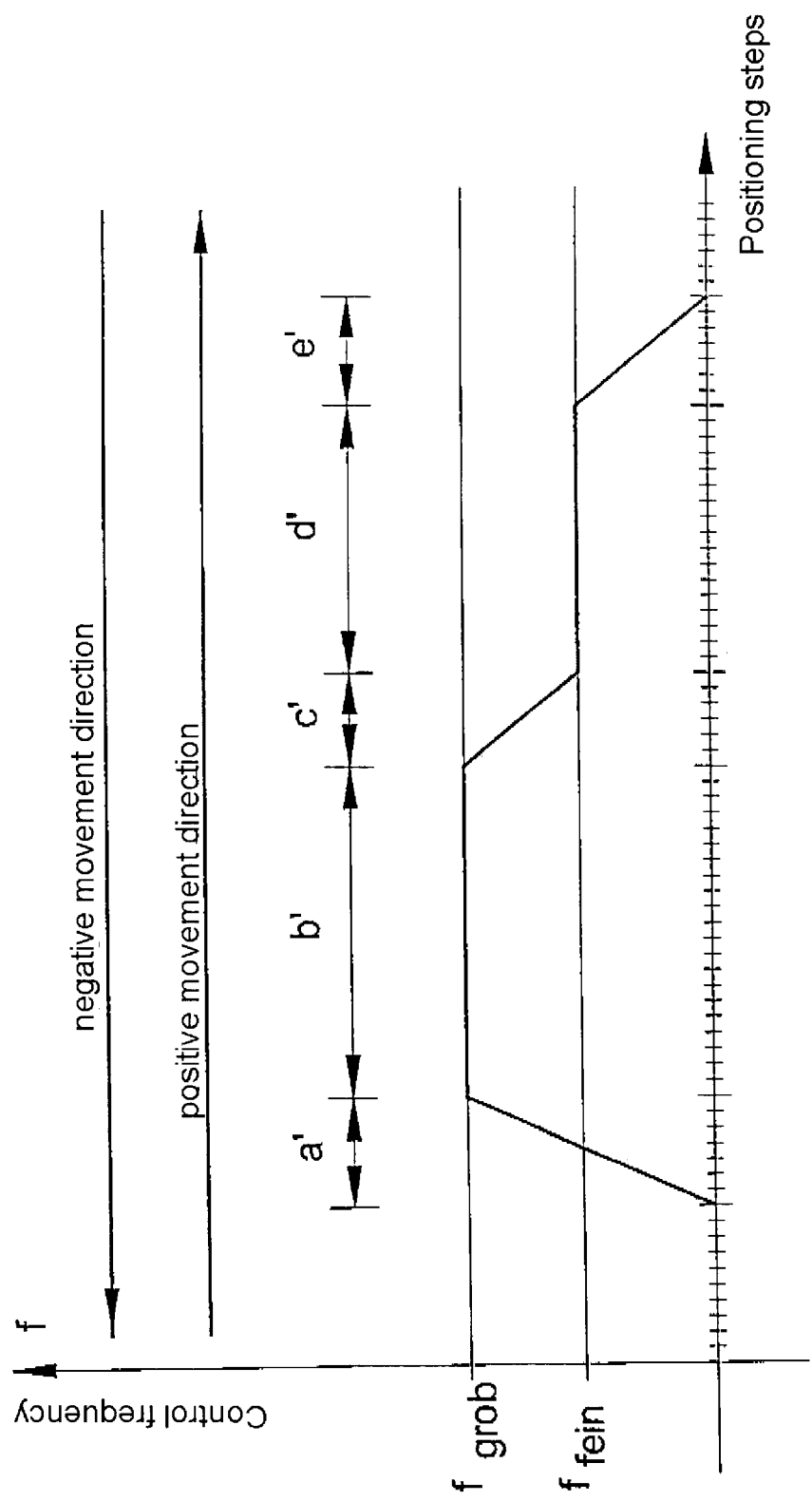
FIG. 2 shows a schematic view of the acceleration process in an adjustment area with two limit control frequencies $f_{grob}$ and $f_{fein}$ for a coarse and a fine positioning speed.

In the drawing according to FIG. 2, by way of example, different maximum control frequencies $f_{grob}$ and $f_{fein}$ are assigned to individual portions a', b', c', d', e', so that a higher adjusting speed, e.g., for coarse positioning, is achieved in the portions with the higher maximum permissible control frequency $f_{grob}$, while only a slower adjusting speed, e.g., for fine adjustment, can be achieved in the portions with the lower maximum permissible control frequency $f_{fein}$.

For the sake of clarity, only the positive movement direction is shown by way of example in FIG. 2. In this case also, a permissible control frequency $f_{zul}$ is stored, according to the invention, for every positioning step. During the adjusting movement, the decision as to whether the current control frequency $f_{ist}$ is less than, equal to or greater than the permissible control frequency $f_{zul}$ of the subsequent positioning step in the movement direction is made for every positioning step in the same manner as that shown above with reference to FIG. 1 and, depending on this, the control frequency f is increased, maintained or decreased, wherein the maximum permissible control frequencies $f_{grob}$ and $f_{fein}$ are not exceeded.

Accordingly, in this case also, the adjustment is always carried out in each of the portions a', b', c', d', e'at optimum speed with reduced technical expenditure.

In summary, the advantages of the solution according to the invention also consist in that the required storage capacity and calculating time for monitoring the acceleration is minimal, the starting positions, stopping positions and reversing positions can be changed at any time in an economical manner, and the quantity of stepping motors and quantity of displacement paths, one of which is assigned to each one of the stepping motors, can be expanded in any manner.

The method according to the invention is also extensively independent from the hardware of instrument technology and, to this extent, is suitable for many different applications While the foregoing description and drawings represent the present invention, it will be obvious to those skilled in the art that various changes may be made therein without departing from the true spirit and scope of the present invention.

What is claimed is:

1. A method for the acceleration of the adjusting movement in a positioning system comprising:

operating at least one stepping motor at a variable control frequency f, the adjusting speed being dependent upon the control frequency f; and initiating a positioning step of the adjusting movement at every period of the control frequency f;

the total number of successive positioning steps corresponding to the length of an adjustment area;

assigning a determined position within the adjustment area to every positioning step;

further including:

initially assigning a permissible control frequency $f_{zul}$ to every positioning step;

storing the assignment of control frequencies $f_{zul}$ to determined positioning steps as a data record in a storage in such a way that it can be called up;

making a comparison, during the operation of the positioning system, for each positioning step between the current control frequency $f_{ist}$ and the maximum permissible control frequency $f_{zul}$ assigned to the subsequent positioning step; and increasing the control frequency f for the subsequent positioning step when the result of the comparison is $f_{ist}<f_{zul}$, the control frequency f for the subsequent positioning step is retained when the result of the comparison is $f_{ist}=f_{zul}$, or the control frequency f for the subsequent positioning step is reduced when the result of the comparison is $f_{ist}>f_{zul}$.

2. The method according to claim 1, wherein extreme positions, such as starting positions, stopping positions and/or reversing positions, are determined within an adjustment area and the permissible control frequency $f_{zul}$ for every positioning step within the adjustment area is determined depending on its distance from extreme positions.

3. The method according to claim 1, wherein the permissible control frequencies $f_{zul}$ in the portions of the adjustment area in which a uniform adjusting movement is provided are determined in conformity to the technically maximum possible control frequencies $f_{max}$ of the stepping motor.

4. The method according to claim 1, wherein a plurality of stepping motors are incorporated in the positioning system, a separate adjustment area being associated with each of these stepping motors, and every stepping motor being combined with a separate control circuit.

5. The method according to claim 1, wherein the stepping motors are connected, respectively, via spindle systems serving to transform the rotating movement into a longitudinal movement, with the component groups of a zoom objective which are variable with respect to position.

* * * * *